Patented Apr. 30, 1929.

1,710,981

UNITED STATES PATENT OFFICE.

ERWIN HOFFA, HANS HEYNA, ERWIN THOMA, AND OTTO HIRSCHEL, OF HOCHST-ON-THE-MAIN, GERMANY, ASSIGNORS TO GRASSELLI DYESTUFF CORPORATION, OF NEW YORK, N. Y., A CORPORATION OF DELAWARE.

VAT DYESTUFFS AND PROCESS OF PREPARING THE SAME.

No Drawing. Application filed May 23, 1927, Serial No. 193,718, and in Germany May 29, 1926.

The present invention relates to new indigoid dyestuffs and to a process of preparing the same.

Our new dyestuffs are obtainable for instance either by oxydizing hydroxythionaphthenes of the general formula:

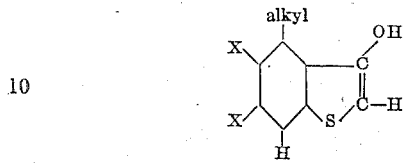

wherein one X stands for an alkyl, the other X for a halogen or by condensing the said hydroxythionaphthenes with components of the general formula:

wherein Y stands for an exchangable group, for instance oxygen, two halogens or an anile residue and V Z W represent atoms two adjacent members of which are carbon atoms of an aromatic residue standing in ortho position, whereas the third member may stand for CS or NH The hydroxythionaphthenes to be used for the reaction can be prepared from the 3.5-dialkyl-4-halogenphenyl-1-thioglycollic acids and from the 3.4-dialkyl-5-halogenphenyl-1-thioglycollic acids respectively and also from those derivatives therefrom which are substituted in 2-position by the nitrile group, $CONH_2$ or carboxyl group. The dyestuffs so obtained may be further halogenated.

The dyestuffs produced by our above described process are remarkable for their very good fastness to light and kierboiling.

The following examples serve to illustrate our invention but are not intended to limit it thereto; the parts are parts by weight:

1. 23 parts of 3.5-dimethyl-4-chlorphenyl-1-thioglycollic acid of the melting point 131–132° C. are introduced, while stirring at —10° C. in 250 parts of chlorosulfonic acid and kept at this temperature for one hour. This mixture is poured on 2000 parts of ice, the hydroxythionaphthene is filtered by suction and washed until the remaining mass shows a neutral reaction. In order to convert it into the dyestuff the hydroxythionaphthene is oxidized in the usual manner, for instance with a solution of potassium ferricyanide or with atmospheric air in presence of copper sulfate.

The dyestuff thus obtained corresponds most probably to the formula

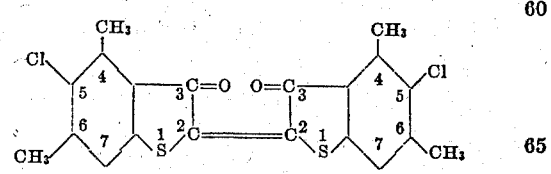

It forms a reddish-violet powder which dissolves in hot concentrated sulfuric acid with a green color. It dyes cotton very bright bluish-red tints of extremely good properties as to fastness.

The parent material for this dyestuff may be prepared by converting the 3.5-dimethyl-4-chlor-1-aminobenzene of the melting point 59–60° C. into the corresponding thioglycollic acid or by transforming the 2.6-dimethyl-1-aminobenzene into the 4-thiocyanogen-2.6-dimethyl-1-aminobenzene replacing the amino group by chlorine and converting the thiocyanogen residue into the thioglycollic acid residue.

2. 40 parts of 3.4-dimethyl-5-chlorphenyl-1-thioglycollic-2-carboxylic acid nitrile are dissolved together with 1250 parts of water, 20 parts of caustic soda solution and 5 parts of sodium sulfide. When dissolution is complete, 180 parts more of caustic soda solution are added and the whole is stirred for two hours at 80–85° C. Immediately on heating the mixture, separation of the sodium salt of the 3-amino-1-thionaphthene-2-carboxylic acid sets in which separation is nearly complete on adding 100 parts of common salt and cooling. After having filtered the mass and washed it with a solution of common salt, the resulting moist paste is dissolved in 20 times the quantity of water to which some caustic soda solution and bisulfite has been added, filtered and the filtrate is acidified with diluted hydrochloric acid and heated on the water bath until the formation of the hydroxythionaphthene is complete. The hydroxythionaphthene is filtered by suction after cooling, washed and converted by the usual method into the dyestuff.

The dyestuff thus obtained forms a reddish-violet powder which dissolves in hot concentrated sulfuric acid with a green color. It corresponds most probably to the formula

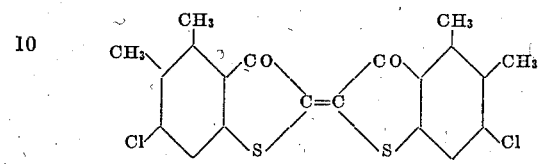

When made up into a vat, it gives a golden yellow solution which dyes cotton very bright bluish-red tints which are of a yellower hue than the dyestuff obtainable according to Example 1, and remarkable for their extremely good properties as to fastness.

The parent material for the dyestuff may be obtained by subjecting the hydrochloride of 1.2-dimethyl-3-aminobenzene to the reactions set forth in German Patents No. 360,690 and No. 364,822 and converting the 2-amino-3.4-dimethyl-5-chlor-1-thioglycollic acid by way of its diazo compound into the 2-cyano-3.4-dimethyl-5-chlor-1-thioglycollic acid.

3. 36 parts of 4-methyl-5.6-dichloro-2.3-dihydro-3-ketothionaphthene-2-(p-dimethylamino)-anile of the probable formula:

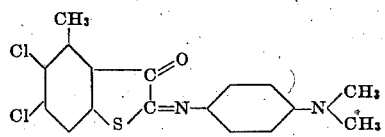

are heated to boiling with 21 parts of 4.6-dimethyl-5-chlor-3-hydroxythionaphthene in 600 parts of glacial acetic acid until the formation of the dyestuff is complete. After cooling, the resulting product is filtered by suction and washed until neutral. It dyes cotton reddish-violet tints of particularly good properties as to fastness. Most probably it corresponds to the formula:

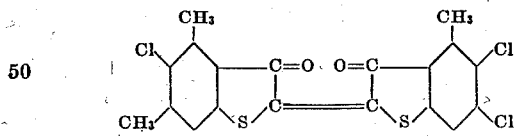

4. 32 parts of 4-methyl-6-chloro-2.3-dihydro-3-ketothionaphthene-2-(p-dimethylamino)-anile of the probable formula:

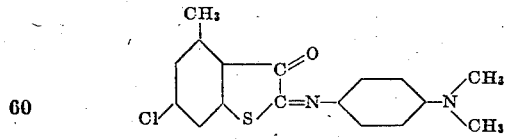

are heated to boiling with 21 parts of 4.5-dimethyl-6-chlor-3-hydroxythionaphthene in 600 parts of glacial acetic acid. The dyestuff, after cooling, is filtered by suction and washed until neutral. It dyes cotton red tints of excellent fastness. Most probably it corresponds to the formula:

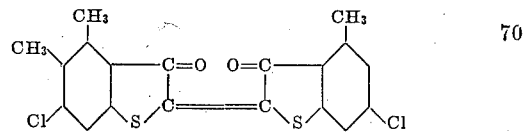

5. 22 parts of 5.7-dichlorisatine are heated on the reflux cooler with 22 parts of phosphorous pentachloride in 100 parts of benzene until the evolution of hydrochloric acid has ceased. After cooling, a solution of 21 parts of 4.6-dimethyl-5-chloro-3-hydroxythionaphthene in 400 parts of benzene is introduced. The separation of the dyestuff begins at once. After 3 hours the dyestuff is filtered by suction and washed with benzene.

The dyestuff thus obtainable forms a bluish-violet powder. It dyes cotton from a golden yellow vat a violet tint of very good properties as to fastness. Most probably it corresponds to the formula:

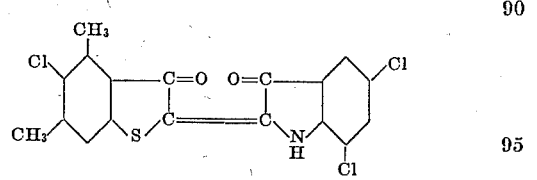

The 4.6-dimethyl-5-chlor-3-hydroxythionaphthene and the 4.5-dimethyl-6-chlor-3-hydroxythionaphthene are also capable of being condensed in the usual manner with other diketones or derivatives thereof, for instance isatine acenaphthenequinone or dichlorisatin anilide.

We claim:

1. As new products, the indigoid dyestuffs characterized by the following grouping of the atoms:

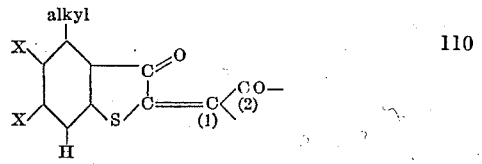

wherein one X stands for an alkyl the other one for halogen the C atoms 1 and 2 belonging to a five-membered ring in which one member may be C, S or NH and the other two members must be carbon atoms of an aromatic ring standing in ortho position, said dyestuffs forming red to reddish-violet powders, dissolving in concentrated sulfuric acid with a coloration varying from green to blue and giving with hydrosulfite and caustic alkali added thereto, yellowish-green to orange-brown vats dyeing cotton red to bluish-violet tints.

2. As new products, the indigoid dyestuffs characterized by the following grouping of the atoms:

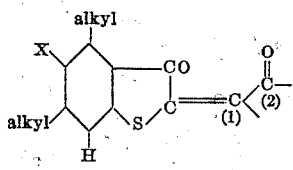

wherein X stands for halogen, the C atoms 1 and 2 belonging to a five membered ring in which one member may be C, S or NH and the other two members must be carbon atoms of an aromatic ring standing in ortho position, said dyestuffs forming red to reddish-violet powders, dissolving in concentrated sulfuric acid with a coloration varying from green to blue and giving with hydrosulfite and caustic alkali added thereto yellowish-green to orange-brown vats dyeing cotton red to bluish-red tints.

3. As new products, the indigoid dyestuffs characterized by the following grouping of the atoms:

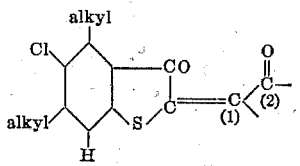

the C atoms 1 and 2 belonging to a five membered ring in which one member may be C, S or NH and the other two members must be carbon atoms of an aromatic ring standing in ortho position, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

4. As new products, the indigoid dyestuffs characterized by the following grouping of the atoms:

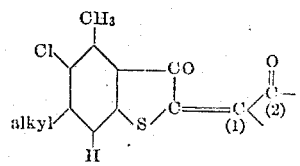

the C atoms 1 and 2 belonging to a five membered ring in which one member may be C, S. or NH and the other two members must be carbon atoms of an aromatic ring standing in ortho position, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

5. As new products, the indigoid dyestuffs characterized by the following grouping of the atoms:

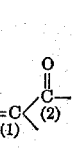

the C atoms 1 and 2 belonging to a five membered ring in which one member may be C, S or NH and the other two members must be carbon atoms of an aromatic ring standing in ortho position, said dyestuffs forming red to reddish-violet powders, dissolving in concentrated sulfuric acid with a coloration varying from green to blue and giving, with hydrosulfite and caustic alkali added thereto, a yellowish-green to orange-brown vats dyeing cotton red to bluish-violet tints.

6. As new products, the indigoid dyestuffs characterized by the following grouping of the atoms:

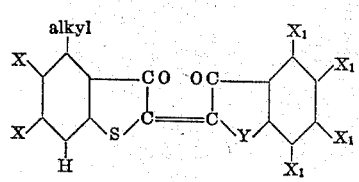

wherein one X stands for an alkyl the other one for halogen, $X_1$ stands for hydrogen or any substituent, Y stands for S, or NH, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

7. As new products, the indigoid dyestuffs characterized by the following grouping of the atoms:

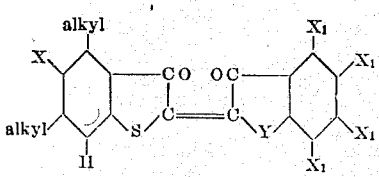

wherein X stands for halogen, $X_1$ stands for hydrogen or any substituent, Y stands for S or NH, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

8. As new products, the indigoid dyestuffs characterized by the following grouping of the atoms:

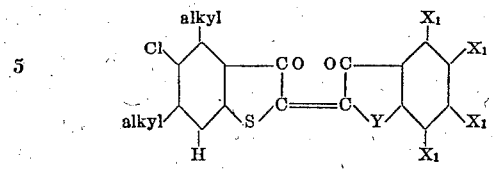

wherein $X_1$ stands for hydrogen or any substituent, Y stands for S or NH, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

9. As new products, the indigoid dyestuffs characterized by the following grouping of the atoms:

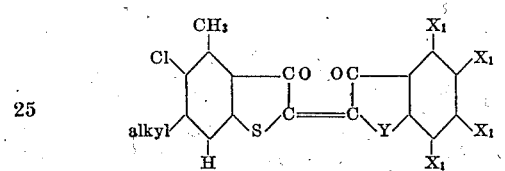

wherein $X_1$ stands for hydrogen or any substituent, Y stands for S or NH, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

10. As new products, the indigoid dyestuffs characterized by the following grouping of the atoms:

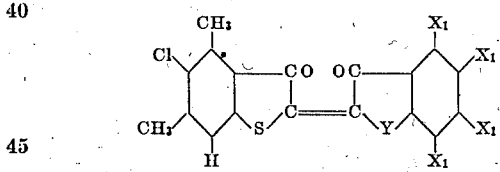

wherein $X_1$ stands for hydrogen or any substituent, Y stands for S or NH, said dyestuffs forming red to reddish-violet powders, dissolving in concentrated sulfuric acid with a coloration varying from green to blue and giving, with hydrosulfite and caustic alkali added thereto, yellowish-green to orange-brown vats dyeing cotton red to bluish-violet tints.

11. As new products, the indigoid dyestuffs characterized by the following grouping of the atoms:

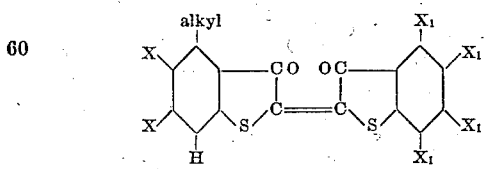

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

12. As new products, the indigoid dyestuffs characterized by the following grouping of the atoms:

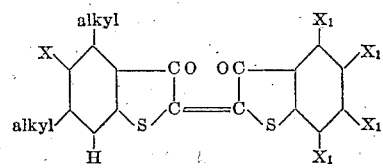

where X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

13. As new products, the indigoid dyestuffs characterized by the following grouping of the atoms:

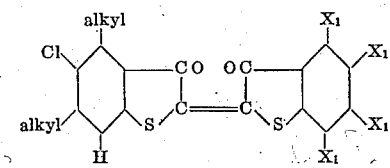

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

14. As new products, the indigoid dyestuffs characterized by the following grouping of the atoms:

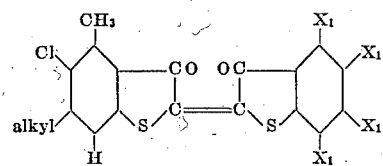

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

15. As new products, the indigoid dyestuffs characterized by the following grouping of the atoms:

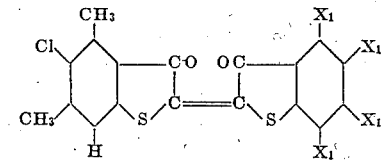

wherein $X_1$ stands for hydrogen or any substituent, said dyestuffs forming red powders, dissolving in cencentrated sulfuric acid with a green coloration, and giving with hydrosulfite and caustic alkali added thereto yellow vats dyeing cotton red tints.

16. As new products, the indigoid dyestuffs characterized by the following grouping of the atoms:

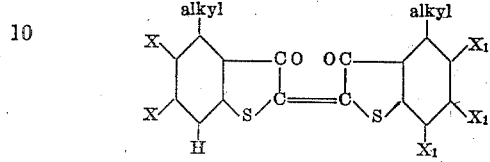

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

17. As new products, the indigoid dyestuffs characterized by the following grouping of the atoms:

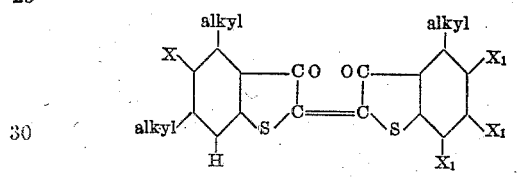

wherein X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

18. As new products, the indigoid dyestuffs characterized by the following grouping of the atoms:

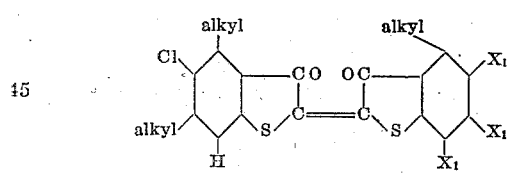

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

19. As new products, the indigoid dyestuffs characterized by the following grouping of the atoms:

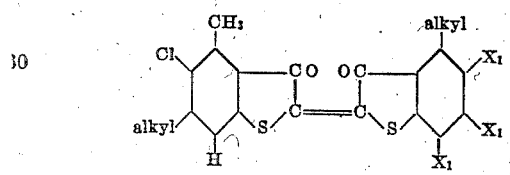

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

20. As new products, the indigoid dyestuffs characterized by the following grouping of the atoms:

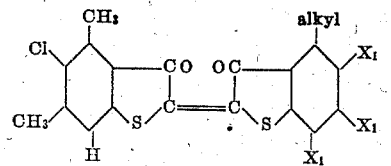

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

21. As new products, the indigoid dyestuffs characterized by the following grouping of the atoms:

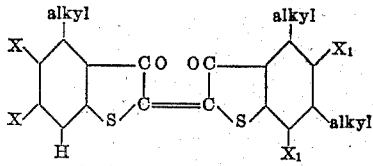

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

22. As new products, the indigoid dyestuffs characterized by the following grouping of the atoms:

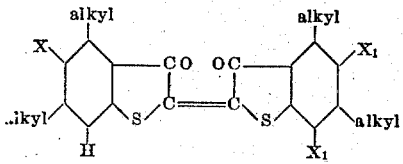

wherein X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

23. As new products, the indigoid dyestuffs characterized by the following grouping of the atoms:

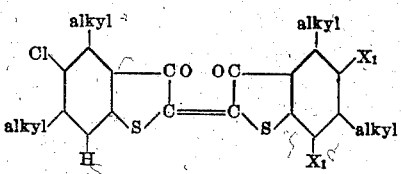

wherein $X_1$ stands for hydrogen, or any substituent, said dyestuffs forming red powders, dissolving in concentrated sulfuric acid with a green coloration, and giving with hydrosulfite and caustic alkali added thereto yellow vats dyeing cotton red tints.

24. As new products, the indigoid dyestuffs characterized by the following grouping of the atoms:

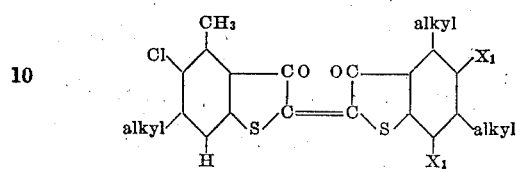

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

25. As new products, the indigoid dyestuffs characterized by the following grouping of the atoms:

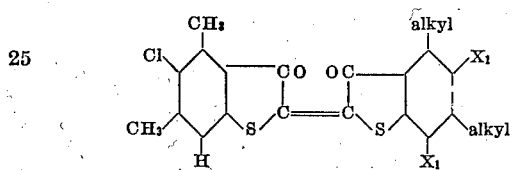

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

26. As new products, the indigoid dyestuffs characterized by the following grouping of the atoms:

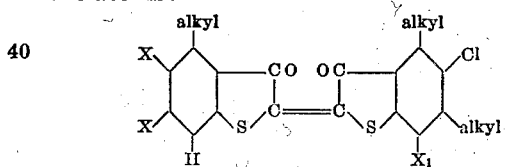

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

27. As new products, the indigoid dyestuffs characterized by the following grouping of the atoms:

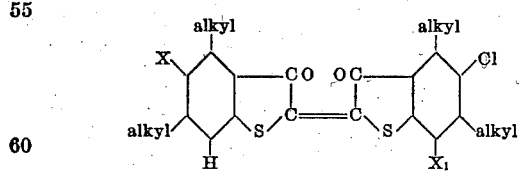

wherein X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

28. As new products, the indigoid dyestuffs characterized by the following grouping of the atoms:

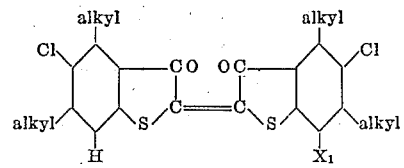

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

29. As new products, the indigoid dyestuffs characterized by the following grouping the atoms:

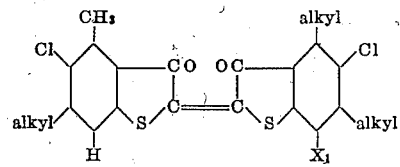

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

30. As new products, the indigoid dyestuffs characterized by the following grouping of the atoms:

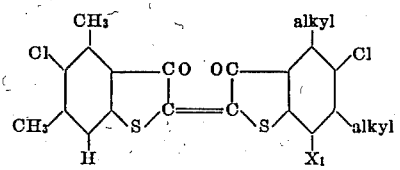

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

31. As new products, the indigoid dyestuffs characterized by the following grouping of the atoms:

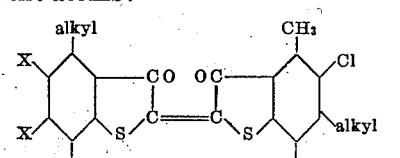

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

32. As new products, the indigoid dyestuffs characterized by the following grouping of the atoms:

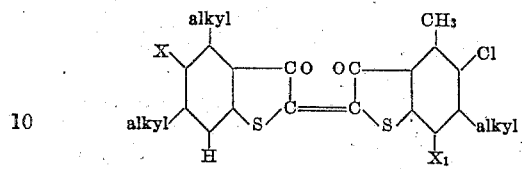

wherein X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

33. As new products, the indigoid dyestuffs characterized by the following grouping of the atoms:

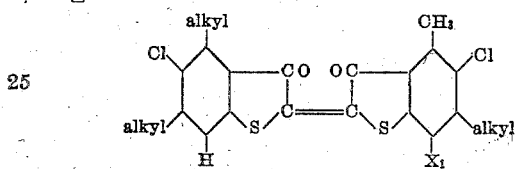

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

34. As new products, the indigoid dyestuffs characterized by the following grouping of the atoms:

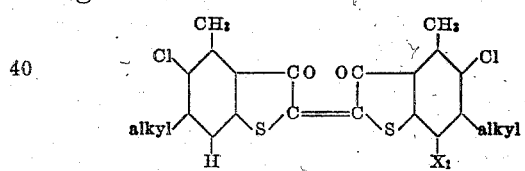

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

35. As new products, the indigoid dyestuffs characterized by the following grouping of the atoms:

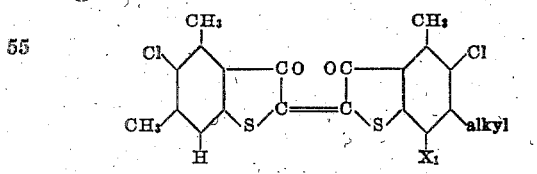

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

36. As new products, the indigoid dyestuffs characterized by the following grouping of the atoms:

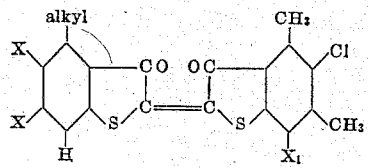

wherein one X stands for an alkyl the other one for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

37. As new products, the indigoid dyestuffs characterized by the following grouping of the atoms:

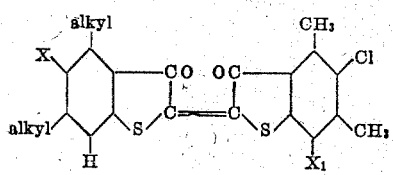

wherein X stands for halogen, $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

38. As new products, the indigoid dyestuffs characterized by the following grouping of the atoms:

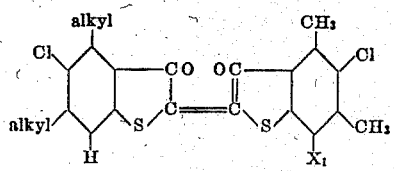

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

39. As new products, the indigoid dyestuffs characterized by the following grouping of the atoms:

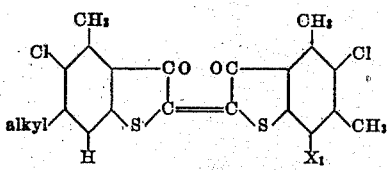

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

40. As new products, the indigoid dyestuffs characterized by the following grouping of the atoms:

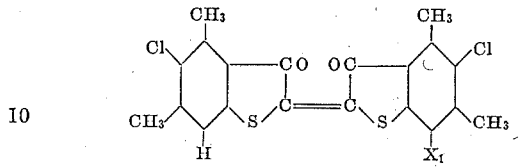

wherein $X_1$ stands for hydrogen or any substituent, said dyestuffs forming red powders, dissolving in concentrated sulfuric acid with a green coloration, and giving with hydrosulfite and caustic alkali added thereto yellow vats dyeing cotton red tints.

41. As a new product, the dyestuff characterized by the following grouping of the atoms:

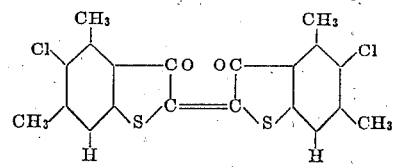

said dyestuff forming a red powder, dissolving in concentrated sulfuric acid with a green coloration, and giving with hydrosulfite and caustic alkali added thereto a yellow vat dyeing cotton red tints.

In testimony whereof, we affix our signatures.

ERWIN HOFFA.
HANS HEYNA.
ERWIN THOMA.
OTTO HIRSCHEL.